US 8,322,507 B2

United States Patent
DeMong et al.

(10) Patent No.: US 8,322,507 B2
(45) Date of Patent: Dec. 4, 2012

(54) CONVEYOR MACHINE HAVING PIVOT CONNECTOR COMPRISING CURVED TRACK AND ROLLERS ENGAGING TRACK

(75) Inventors: Maurice DeMong, Wakaw (CA); Edward Krueckl, Saskatoon (CA)

(73) Assignee: Prairie Machine & Parts Mfg. (1978) Ltd., Saskatoon (CA)

( * ) Notice: Subject to any disclaimer, the term of this patent is extended or adjusted under 35 U.S.C. 154(b) by 0 days.

(21) Appl. No.: 13/035,492

(22) Filed: Feb. 25, 2011

(65) Prior Publication Data

US 2011/0192702 A1    Aug. 11, 2011

Related U.S. Application Data

(60) Division of application No. 12/462,598, filed on Aug. 4, 2009, now Pat. No. 7,946,410, which is a continuation of application No. PCT/CA2008/000243, filed on Feb. 7, 2008.

(30) Foreign Application Priority Data

Feb. 8, 2007  (CA) ..................... 2578431

(51) Int. Cl.
*B65G 43/00*  (2006.01)
(52) U.S. Cl. ............... 198/301; 198/300; 198/602
(58) Field of Classification Search .......... 198/300, 198/301, 303, 602, 603, 306
See application file for complete search history.

(56) References Cited

U.S. PATENT DOCUMENTS

| | | | |
|---|---|---|---|
| 1,340,169 A | 5/1920 | Jessen | |
| 2,091,668 A | 8/1937 | Bradford | |
| 2,948,552 A | 8/1960 | Moon | |
| 3,231,064 A | 1/1966 | Towles | |
| 3,268,058 A | 8/1966 | Buckeridge et al. | |
| 3,279,584 A | 10/1966 | Towles | |
| 3,361,248 A | 1/1968 | Daymon | |
| 3,625,339 A | 12/1971 | Smith | |
| 4,003,586 A | 1/1977 | Luck | |
| 4,031,997 A | 6/1977 | Nelson | |
| 4,054,213 A | 10/1977 | Chever | |
| 4,206,840 A | 6/1980 | Hanson | |
| 4,253,256 A * | 3/1981 | Feliz | 37/104 |
| 4,382,607 A * | 5/1983 | Voight | 280/408 |
| 4,646,906 A | 3/1987 | Wilcox, Jr. et al. | |
| 4,951,801 A * | 8/1990 | Mraz | 198/303 |
| 5,185,935 A | 2/1993 | McMillion et al. | |
| 5,293,986 A | 3/1994 | Mouritzen et al. | |
| 5,299,674 A | 4/1994 | Cusitar | |
| 5,366,059 A | 11/1994 | Demong | |
| 5,634,545 A | 6/1997 | Plumley | |
| 5,749,452 A | 5/1998 | Kanenwischer | |
| 6,095,320 A * | 8/2000 | DeMong et al. | 198/812 |
| 6,155,400 A | 12/2000 | Daigh et al. | |
| 6,494,476 B2 | 12/2002 | Masters et al. | |
| 7,866,462 B2 | 1/2011 | DeMong | |
| 2009/0272631 A1 | 11/2009 | Demong | |
| 2009/0276122 A1 | 11/2009 | Demong et al. | |

\* cited by examiner

*Primary Examiner* — Joseph A Dillon, Jr.
(74) *Attorney, Agent, or Firm* — Lipsitz & McAllister, LLC

(57) ABSTRACT

A mobile conveyor machine is provided for a cascading conveyor system in the form of a series of mobile conveyor machines pivotably connected together in the form of a conveyor train.

7 Claims, 13 Drawing Sheets

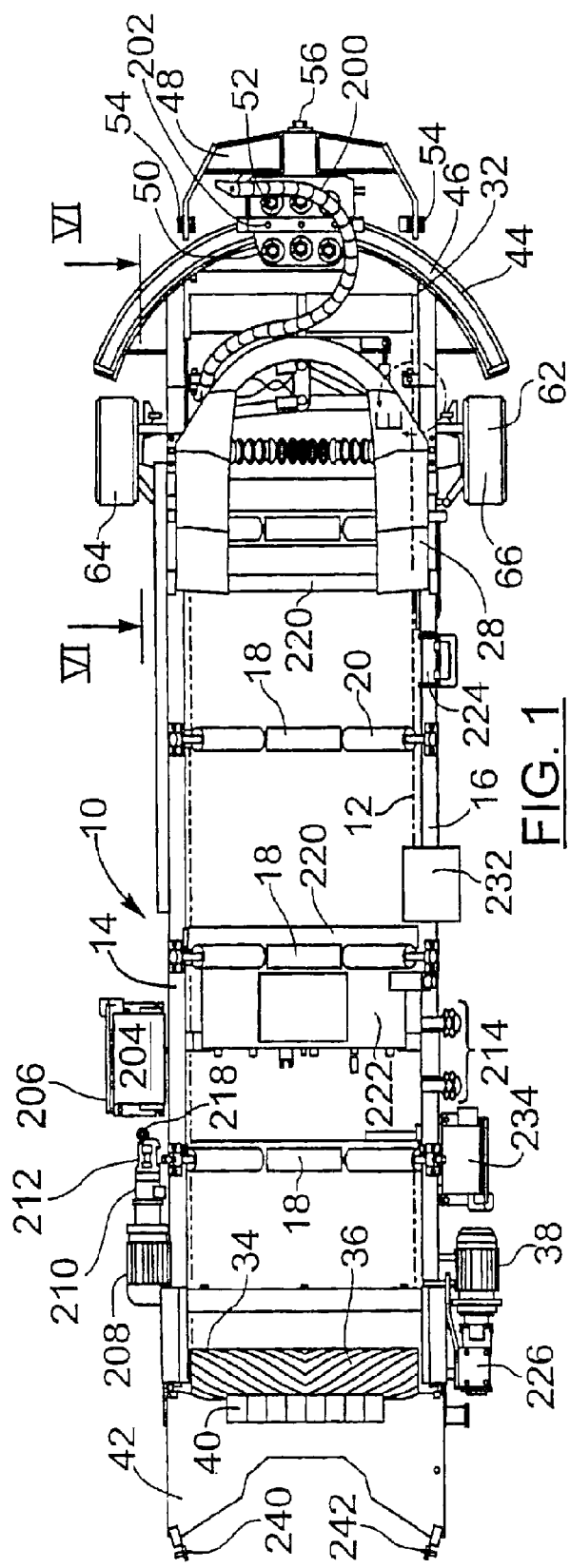
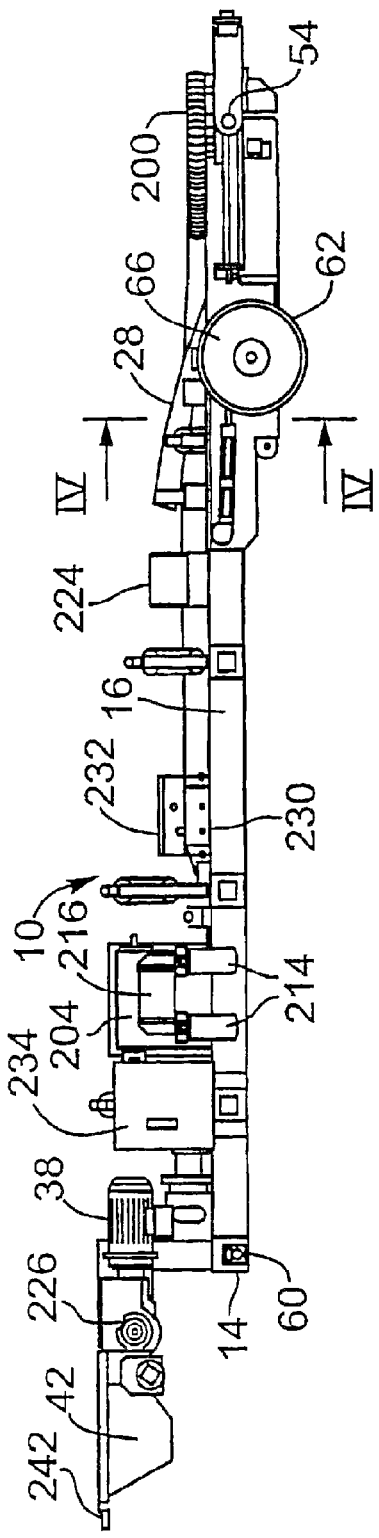
FIG. 1
FIG. 2

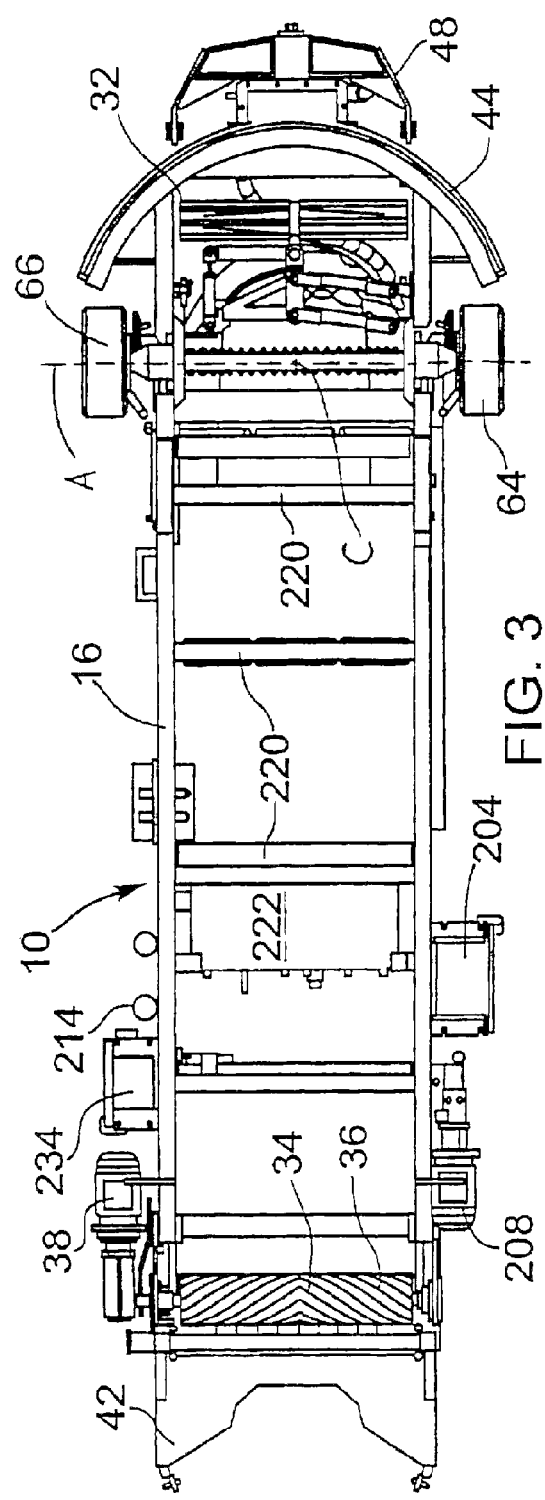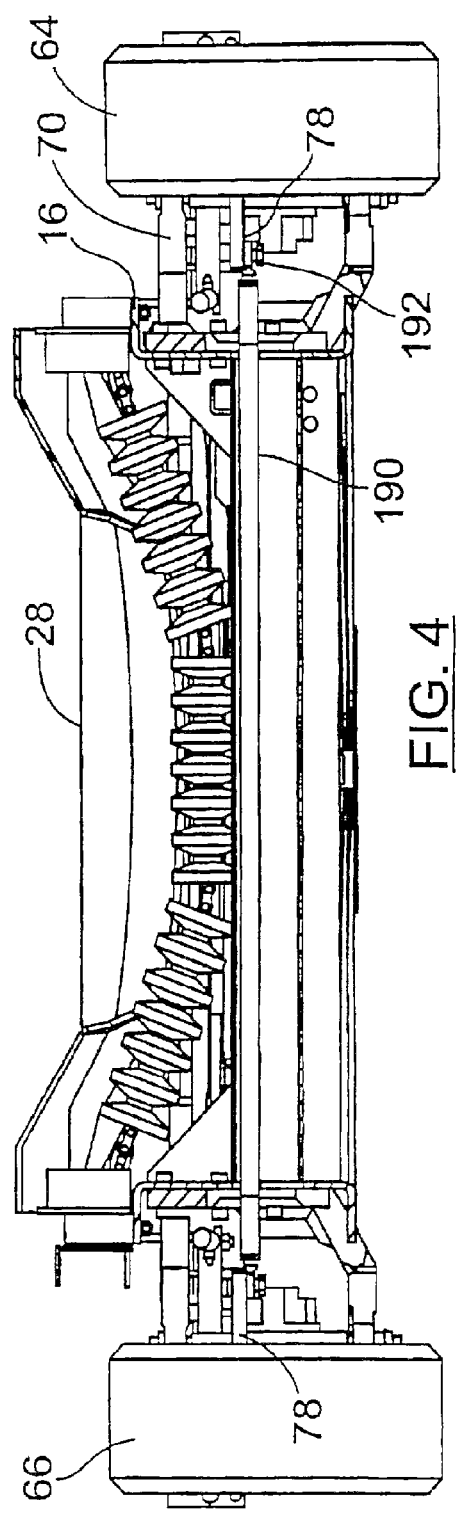

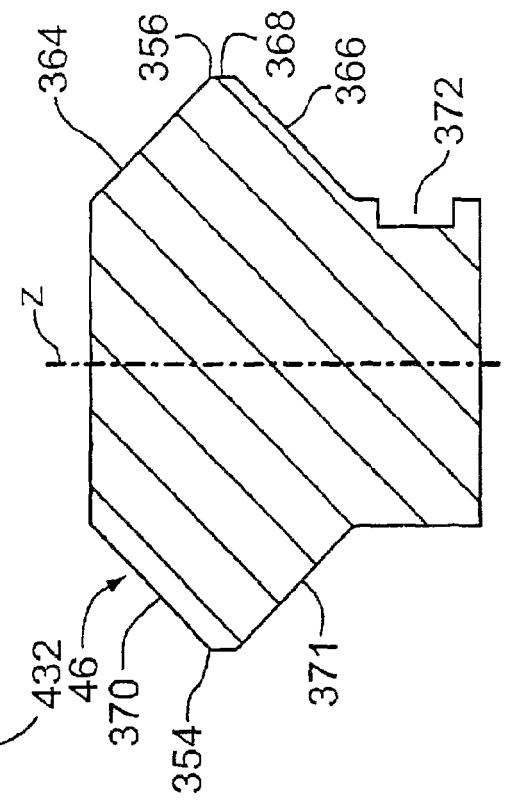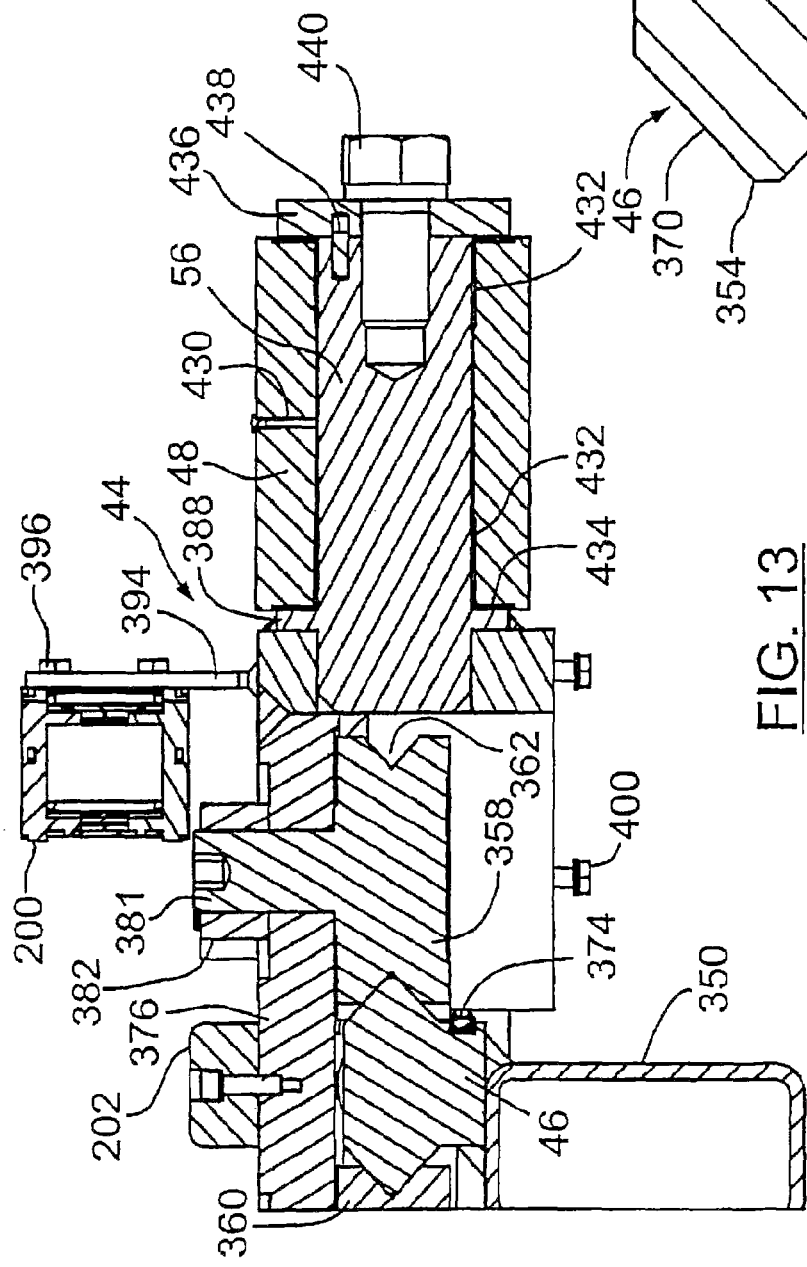
FIG. 13
FIG. 14

CONVEYOR MACHINE HAVING PIVOT CONNECTOR COMPRISING CURVED TRACK AND ROLLERS ENGAGING TRACK

This application is a divisional of U.S. patent application Ser. No. 12/462,598 filed on Aug. 4, 2009, which is a continuation of International Application No. PCT/CA2008/000243 filed on Feb. 7, 2008 and which claims priority of Canadian Patent Application No. 2,578,431 filed on Feb. 8, 2007, each of which is incorporated herein by reference in their entirety and for all purposes.

BACKGROUND OF THE INVENTION

This invention relates to conveyor systems and, in particular, mobile conveyor machines for use with endless conveyor belts and hitching apparatus for use with such machines and other mobile machines.

Belt conveyors are well known and are efficient means for moving large quantities of materials such as ore, coal and granular stone over a predetermined distance extending either horizontally, vertically or both. One form of conveyor system known for mining applications is a system involving a series of conveyors mounted on wheels so as to make the system easily movable. Because of the manner in which mines are developed and extended, it may be necessary for a relatively long conveyor system to be moved along a substantially curved or zig zag course. Under such circumstances, it can be difficult and time consuming to move the conveyor system when required. It will also be appreciated that it may be necessary to move the conveyor system and to make adjustments to the system fairly frequently as the mining machine advances in a mine.

U.S. Pat. No. 5,366,059 issued Nov. 22, 1994 to Prairie Machine & Parts Mfg. Ltd. describes and illustrates a conveyor system comprising a plurality of conveyor vehicles connected together in the form of a train and also describes a steering system for steering this train of vehicles. All but one of the vehicles in the train has a single pair of steerable wheels with the vehicle at the outby end of the train (that is the end to which the mine material is being delivered) having two steerable wheels. Hydraulic cylinders are used to steer each of the pairs of steerable wheels and there is a control mechanism for controlling and coordinating these cylinders in order to set the steering angles of the pairs of wheels. In this known system, each pair of wheels is mounted on an axle and each pair is driven by an electric tram motor mounted along the longitudinal centre of the conveyor vehicle. One difficulty encountered with this known conveyor system is that the system is relatively high along most of the length of the train and therefore the ceiling of the region of the mine where the mining machine is operating must be reasonably high, for example over six feet, to accommodate this conveyor system. Moreover, in this known system, the height of each pair of wheels relative to the conveyor frame is not adjustable.

There is a need in the belt conveyor industry to provide a hitching apparatus for pivotably connecting one end of a conveyor vehicle or conveyor machine to an adjacent end of another conveyor vehicle or conveyor machine. In particular, it is desirable to provide a new hitching apparatus which can be provided at one end of a conveyor machine that has a desirable low profile in order that the machine, as well as other machines connected thereto, can be used in areas of mines or mine shafts that have a relatively low ceiling, for example, a ceiling that is less than six feet. Such low ceiling mine areas and mine shafts are relatively common and it will be appreciated that often, from a mine economic standpoint, it may be too expensive to simply increase the ceiling height in order to accommodate a mobile conveyor system.

In addition, there is a perceived need to provide a reliable hitching apparatus for a mobile machine such as a mobile conveyor wherein the pivot point between two adjacent mobile machines or mobile conveyors is located between the pair of wheels located adjacent one end of one of the machines in order to enable the conveyor machines to be steered properly using an automated steering system for the conveyor system which is operated by an operator of the system.

SUMMARY OF THE INVENTION

According to one aspect of the invention, a hitching apparatus for use on a first mobile machine to be used with a second mobile machine connected to the first mobile machine includes a track member adapted for mounting at an end of the first mobile machine. This track member provides a track having two opposite sides and is bent to form a circular arc having a center of curvature. The sides include an outer convex side adapted to face towards the end of the first mobile machine and an inner concave side. The apparatus further includes a hitch unit mounted for rolling movement on the track and adapted to connect pivotably the end of the first mobile machine to the second mobile machine. This hitch unit includes rollers for engaging both of the opposite sides whereby the track is captured by the rollers. The rollers have first and second sets of rollers having V-grooves formed about their circumferences. When the first mobile machine has the hitching apparatus mounted thereon, this first machine is able to pivot about a substantially vertical axis extending through the center of curvature relative to the second mobile machine connected thereto by the hitch apparatus.

In an exemplary embodiment of the hitching apparatus, the opposite sides of the track are V-shaped and include an outer convex side adapted to face towards an adjacent end of the first mobile machine and an inner concave side. In this exemplary version, the rollers includes first and second sets of rollers having V-grooves formed about their circumferences, the first set engaging the outer convex side and the second set engaging the inner concave side.

According to a further aspect of the invention, a mobile conveyor machine for use with an endless conveyor belt and a conveyor system in the form of a plurality of mobile conveyor machines pivotably connected together in an end-to-end manner includes a conveyor mechanism having an elongate supporting frame with two longitudinal side frame members on opposite sides thereof and two opposite end sections between which the conveyor belt extends when mounted on the conveyor mechanism. A pair of transversely aligned wheel units is provided to support and move the conveyor machine with each wheel unit having a wheel support structure connected to a respective one of the side frame members and a wheel mounted on the wheel support structure for pivotable movement about a respective substantially vertical pivot axis for steering the conveyor machine. A curved track is mounted at one end of the supporting frame and extends in a substantially horizontal circular arc when the conveyor machine is positioned on a horizontal surface. The arc has a center of curvature located between the wheel units. A hitch unit is mounted on the track for rolling movement along the track and is adapted to connect pivotably the conveyor machine at the one end to an adjacent end section of another mobile conveyor machine. There is also a sensor device for determining a substantially horizontal angle between a longitudinal central axis of the conveying machine and a central longitudinal axis of another mobile conveyor machine and for transmitting an electrical signal indicative of this angle to a steering controller of the system. The conveyor machine during use as part of the conveyor system is able to pivot about a substantially vertical axis extending through the center of curvature relative to another mobile conveyor machine connected to the first mentioned conveyor machine by means of the hitch unit.

In an exemplary embodiment, the hitch unit includes a car hitch frame and rollers each rotatably mounted in the hitch frame for rotation about a substantially vertical axis and for rolling engagement with the track.

According to still another aspect of the invention, there is provided a mobile conveyor machine for a cascading conveyor system in the form of a series of mobile conveyor machines pivotably connected together in the form of a conveyor train. The conveyor machine comprises an elongate supporting frame arranged substantially horizontally and having longitudinal side frame members and first and second ends. The supporting frame extends along a central longitudinal axis of the conveyor machine. A conveyor belt system is mounted on the supporting frame and arranged to convey materials from the first end to the second end. A pair of transversely aligned propelling devices are each separately connected to the supporting frame for pivotable movement about a generally vertical pivot axis. This pair is located near but spaced from the first end and has a common axis of rotation when the propelling devices are positioned to move the conveyor machine in a straightforward direction. The machine also includes a power mechanism for steering the pair of propelling devices. A pivot mechanism for pivotably connecting the mobile conveyor machine at the first end to an end section of another mobile conveyor machine includes a curved track bent in a horizontal circular arc having a center of curvature located midway between the propelling devices on the axis of rotation and rigidly mounted on the supporting frame. The pivot mechanism further includes a hitch unit mounted for rolling movement on the track and connected to the track. This hitch unit has roller means engaging the track and is adapted for detachable connection to the another mobile conveyor machine.

These and other aspects of the disclosed mobile conveyor machine and a hitch apparatus for use on such a machine and other types of mobile machines will become more readily apparent to those having ordinary skill in the art from the following detail description taken in conjunction with the accompanying drawings.

BRIEF DESCRIPTION OF THE DRAWINGS

The present invention will hereinafter be described in conjunction with the appended drawing figures, wherein like reference numerals denote like elements, and:

FIG. 1 is a top view of an exemplary embodiment of a mobile conveyor machine or vehicle constructed in accordance with the invention;

FIG. 2 is a side elevation of the conveyor vehicle of FIG. 1;

FIG. 3 is a bottom view of the conveyor machine of FIGS. 1 and 2;

FIG. 4 is a sectional elevation taken along the line IV-IV of FIG. 2;

FIG. 13 is a vertical cross-section taken along the line XIII-XIII of FIG. 15 illustrating how the rollers of the hitch unit engage the curved track;

FIG. 14 is a detail view showing the transverse cross-section of the curved track according to an exemplary embodiment;

DETAILED DESCRIPTION

Figure 5:
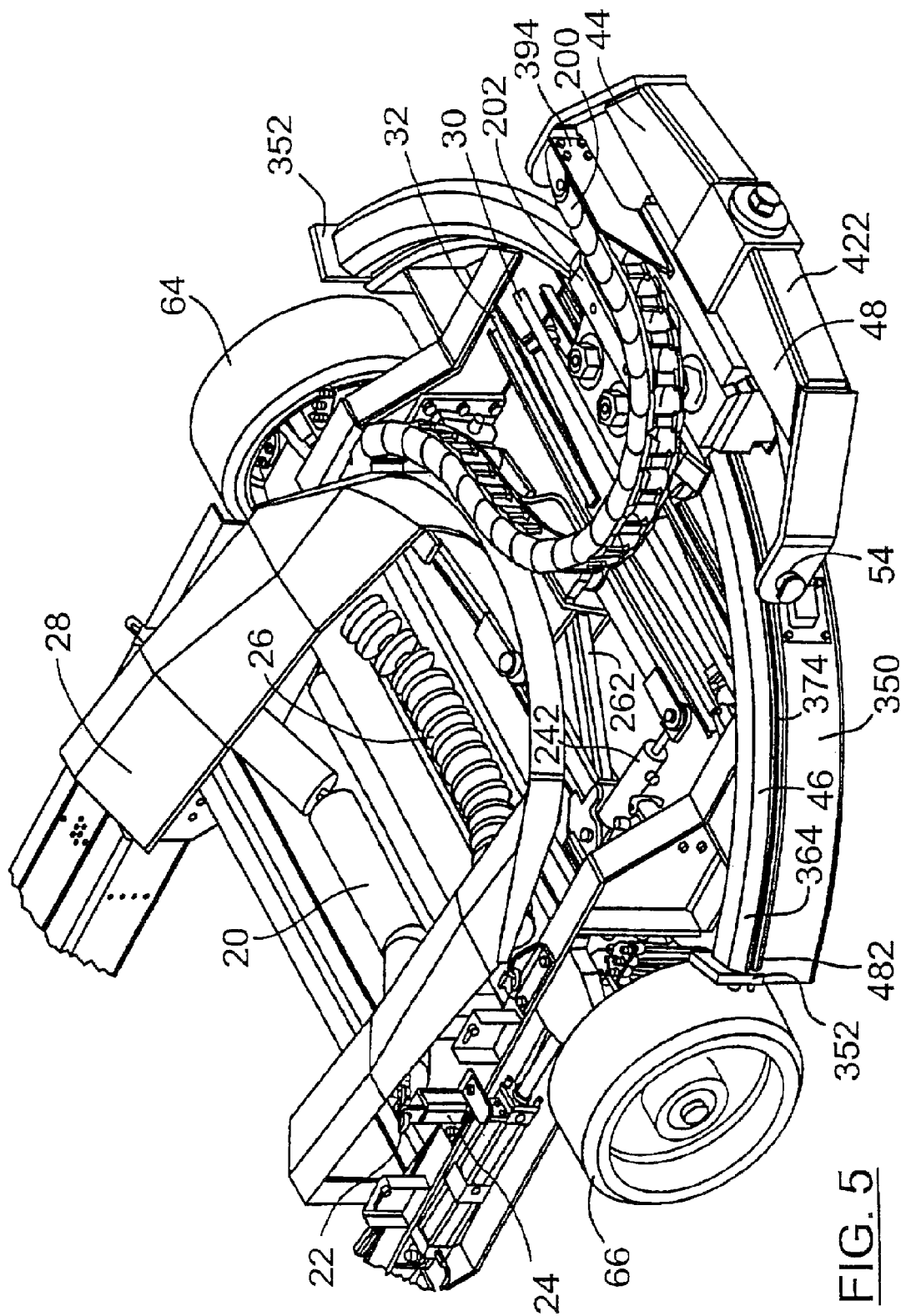
FIG. 5 is a perspective view taken from above and from the tail pulley end of the conveyor machine, this view showing an end section of the machine including its two wheels.

Major components of a conveyor vehicle constructed in accordance with the invention are illustrated in FIGS. 1 to 5 of the drawings. The illustrated, low profile conveyor vehicle 10 has been shown without the usual flexible conveyor belt, the location of which is only indicated in chain-link lines in FIG. 1 for sake of illustration. This conveyor belt 12 is an endless conveyor belt and can be of standard construction depending upon the type of material being conveyed by the conveyor system. The illustrated exemplary vehicle is intended for use as an intermediate conveyor car of which there may be five, ten or more in a train of conveyor vehicles similar to the train illustrated and described in U.S. Pat. No. 5,366,059. It will be understood that in addition to a plurality of intermediate conveyor vehicles pivotably connected end-to-end, there can also be a loading conveyor vehicle which is located at the end of the train adjacent the mining machine, and a discharge conveyor vehicle located at the opposite end of the train which is referred to as the outby end, that is, the end to which the train of vehicles delivers the material. The loading car assembly can be constructed in a similar manner to the illustrated intermediate car assembly 10, except that it need not be provided with a hitch mechanism at its inby or hopper end, since there is no need to attach this end to another conveyor vehicle. As for the discharge conveyor vehicle, it is provided with two pairs of transversely aligned wheel units rather than a single pair of these wheel units described hereinafter. However, the wheel units on the discharge car can be constructed in the same manner as described hereinafter, including their steering mechanism and their hydraulic drive mechanism. The discharge car is also provided with a pivotable cross-conveyor for discharging the material onto a permanent or fixed conveyor in the mine. A cross-conveyor and its use is described and illustrated in U.S. Pat. No. 5,366,059. A detailed description of the discharge car and its cross-conveyor herein is deemed unnecessary as a cross-conveyor system is not considered an aspect of the invention claimed herein.

Turning now to the illustrated conveyor vehicle 10, this vehicle has a conveyor mechanism 14 that includes an elongate, substantially horizontal frame 16 and a series of spaced apart conveyor roller devices 18 mounted on the horizontal frame 16 and adapted to support rotatably an upper run of the continuous conveyor belt 12 extending between opposite end sections of the vehicle. The roller devices 18 can be of standard construction available from conveyor parts suppliers. Each illustrated roller device comprises three metal rollers 20 which are pivotably connected together in an end-to-end fashion by their central shafts. The outer end of each outer roller is connected by a chain 22 (see FIG. 5) to a vertical support post 24 mounted on a main, longitudinally extending frame member of the main frame 16. The height of each pair of posts 24 varies as shown to gradually increase the height of the roller devices. In addition to the cylindrical, rotatable metal rollers 20, there can also be provided impact rollers 26 of known construction positioned below a U-shaped hopper member 28. It will be understood that the impact roller helps to absorb the impact of material dropping onto the conveyor belt at this location.

The conveyor mechanism 14 further includes a tail pulley unit mounted adjacent one end of the conveyor mechanism on the horizontal frame 16 and having a rotatable tail pulley indicated at 32. Further details of the construction of the tail pulley unit are provided hereinafter with reference to FIGS. 5 and 26. The conveyor mechanism 14 further includes a head pulley unit 34 mounted adjacent the second end of the conveyor mechanism opposite the first end where the tail pulley is located. The head pulley unit includes a rotatable head pulley 36 which, in a known manner, can be provided with a gripping cylindrical surface which enables the head pulley unit to drive the conveyor belt 12. There is also an electric motor mechanism 38 which can be considered part of the head pulley unit since it rotates the head pulley 36 to move the conveyor belt and thus to transport material from the tail pulley to the head pulley. A belt scraper 40 of known construction can be mounted adjacent to the head pulley to help keep the conveying surface of the belt clean. Mounted adjacent to the head pulley at the outby end of the vehicle is a material hopper 42 which helps direct the material onto the conveyor belt of the next conveyor vehicle of the train. In order to provide a conveyor vehicle 10 having a low profile, there is provided a pivoting hitch mechanism 44 at the inby end of the vehicle. This hitch mechanism includes a curved steel track and a rolling hitch device 48 having two sets of grooved rollers located at 50 and 52 on two opposite V-shaped sides of the track 46. Two car hitch pins 54 are located on opposite sides of the hitch device 48 which is able to pivot about a central longitudinal axis of the vehicle by mean of central pivot pin 56 (see FIG. 13). Located near the opposite head pulley end of the car are two hitch pin holders 60, one on each side of the frame 16.

Figure 7:
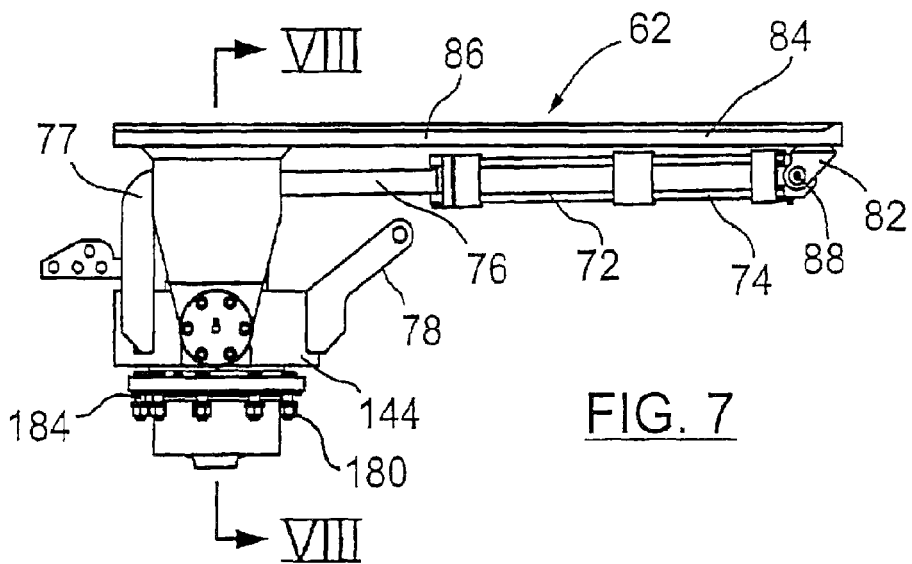
FIG. 7 is a detail top view of a left hand wheel unit assembly of the vehicle of FIGS. 1 and 2, this view omitting the wheel itself for sake of illustration.

The conveyor vehicle 10 has a pair of transversely aligned wheel units indicated generally at 62 for supporting and moving the conveyor vehicle. Each of these wheel units is separately connected to the horizontal frame 16 including any extension thereof. In particular, each wheel unit is connected to a respective longitudinally extending side of the frame. Each wheel unit has its own solid wheel with the wheel on the left side indicated at 64 and the wheel on the right hand side indicated at 66. As explained more fully hereinafter, each wheel 64, 66 is mounted for pivotable movement about a substantially vertical pivot axis for steering purposes, that is, to steer the vehicle 10. In an exemplary embodiment of the conveyor vehicle, each wheel unit includes a standard hydraulic motor 68 shown clearly in FIG. 8. This motor is used to rotate or drive the wheel of the respective wheel unit. Also, each wheel unit includes a non-rotating wheel support structure indicated generally at 70 for detachably connecting the wheel unit to the horizontal frame, including any extension of this frame. The left hand wheel unit 62, with its wheel removed, is illustrated in FIG. 7 and is illustrated with its wheel in FIGS. 8 and 9. FIG. 7 also shows a power steering mechanism or power steering means 72 for steering the wheel of this wheel unit. The illustrated power steering mechanism includes a hydraulic linear actuator having a hydraulic cylinder 74 and an actuator rod 76 slidable in the cylinder. A steering arm 77 having a L-shape is rigidly attached at one end to an upper section of a motor support member 144 (see FIG. 12) and is pivotably connected at its other end to the rod 76 by means of a bolt and nut 80 (see FIG. 9). The closed end of cylinder 74 is pivotably mounted by means of lugs 82 to an end of a horizontally extending, elongate arm section 84 which is part of a wheel unit mounting plate 86. A nut and bolt combination 88 pivotably connects a short connecting plate 90 that is rigidly attached to the end of the cylinder to the lugs 82. The actuator rod 76 can be provided with a spherical bearing 92 that is connected by threads to the outer end of the rod. This bearing is connected to the steering arm 77 by the nut and bolt 80.

Figure 6:
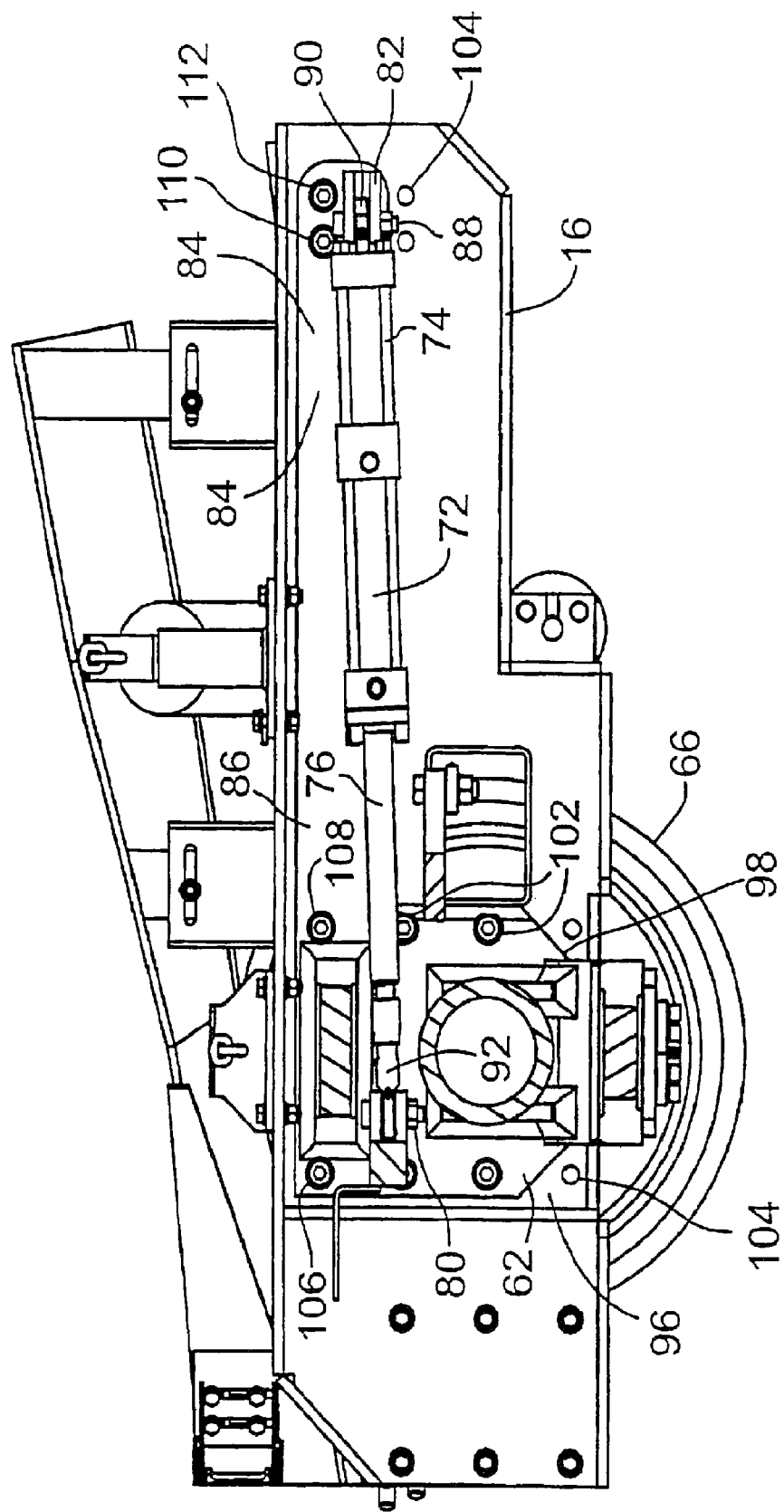
FIG. 6 is a sectional elevation taken along the line VI-VI of FIG. 1, this view showing details of the power steering arrangement for each wheel.

In addition to the arm section 84, the flat mounting plate 86 includes a main plate portion 96 shown in FIG. 6. This main plate portion has a generally rectangular shape except for cut-off bottom corners 98. The arm section 84 extends horizontally from an upper corner of the main plate portion 96. An advantage provided by the arm section 84 is that the hydraulic cylinder can then be pivotably mounted to the same mounting plate 86 as the wheel and its hydraulic motor 68. As can be seen from FIGS. 6 and 1, each wheel unit 62 and, in particular its mounting plate 86 (which is part of the wheel support structure), is formed with a plurality of apertures or holes indicated generally by reference 100 which are provided to receive fasteners, preferably bolts, used to attach the respective wheel unit to the frame 16, including any extension thereof. A plurality of fasteners 102 for this purpose are insertable through spaced-apart apertures 104, four of which can be seen in FIG. 6. There are a plurality of the apertures 104 formed in each longitudinally extending side of the frame 16 and optionally additional apertures can be provided in extension plates attachable to the main frame members. The apertures 100 formed in the mounting plate 86 are located in opposite end sections of the mounting plate as clearly shown in FIG. 11. The illustrated aperture arrangement permits the height of each wheel unit relative to the horizontal frame 16 to be adjusted between either one of two possible positions, but it will be appreciated by those skilled in the art that by providing further apertures 104, for example, on each longitudinal frame member or an extension plate, it is possible to provide for more than two possible height positions for each wheel unit. In the position of the wheel unit illustrated in FIG. 6, the wheel unit 62 is at its maximum height relative to the frame 16. In this position, the overall height of the conveyor vehicle will be a minimum height which, in an exemplary embodiment, is only four feet or forty-eight inches as compared to earlier conveyor vehicles such as those described and illustrated in U.S. Pat. No. 5,366,059 which had an overall height of six feet or seventy-two inches. In this position of the wheel units in the exemplary embodiment, the ground clearance provided under the vehicle is six inches. However, in the event that mining conditions require greater ground clearance and provided the mine area has an adequate ceiling or working height for the conveyor system, the wheel units can be moved to the second position which can provide an additional four inches of ground clearance for a total of ten inches. In this case, the overall height of the conveyor vehicle is fifty-two inches.

Figure 8:
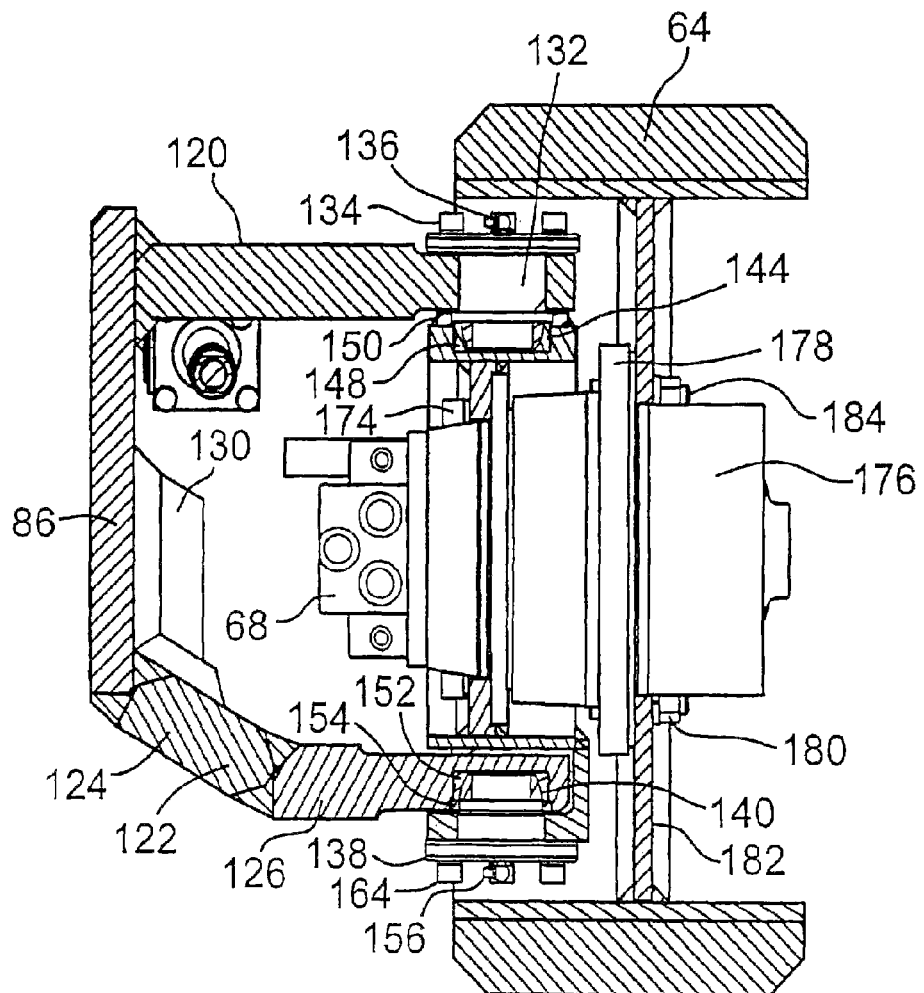
FIG. 8 is a detail sectional elevation taken along the line VIII-VIII of FIG. 7.
Figure 9:
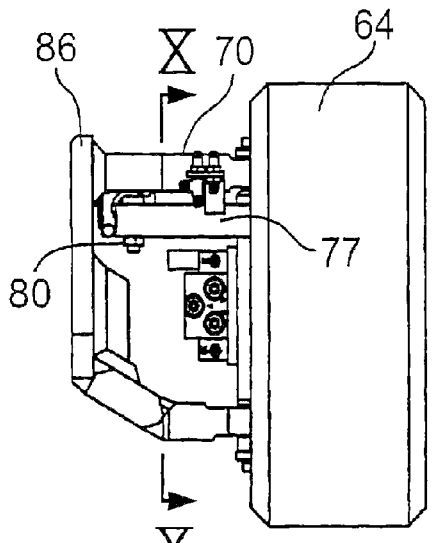
FIG. 9 is a detail end view of the wheel unit assembly of FIG. 7, this view being taken from the left side of FIG. 7 and showing the wheel mounted on the assembly.
Figure 11:
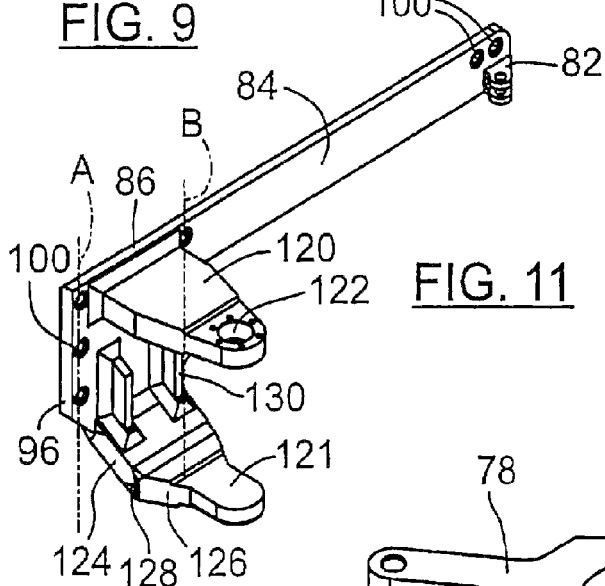
FIG. 11 is a perspective detail view of a mounting plate weldment used to support each wheel and its hydraulic motor.

Turning now to the wheel support structure 70, shown in FIGS. 8 and 11, the wheel support structure includes upper and lower, horizontally extending wheel supporting arms 120, 122, both with rounded distal ends. The upper arm 120 can be formed from a single steel plate welded to the top of mounting plate 86 and is formed with a round hole 122 to receive an upper pivot pin member. As illustrated, the lower support arm 122 can be constructed of two short plate members 124, 126 which are welded together at 128 and which extend at an obtuse angle to one another as shown in FIG. 8. The strength and rigidity of the connection between the sloping plate 124 and plate 86 can be strengthened by two vertically extending gussets 130 which are welded to these plates. A top pivot pin 132 is mounted in the hole 122 and is connected to the upper arm 120 by six screws 134. The pivot pin can be provided with a central passageway (not shown) that extends downwardly from grease zerk 136. There is also a bottom pivot pin 138 having a reduced top end extending into a circular recess 140 formed in the rounded end section of the lower support arm 122.

Figure 12:
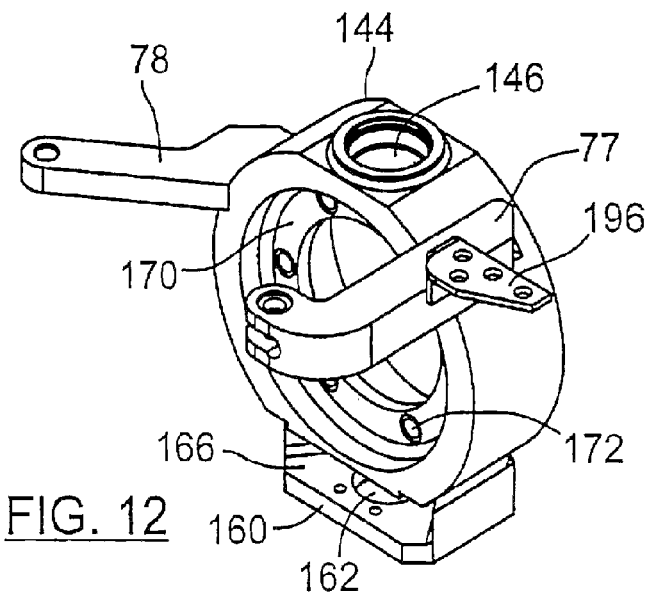
FIG. 12 is a detail perspective view illustrating a pivotable motor support member mounted adjacent each wheel.

In order to pivotably support the wheel and its hydraulic motor 68, there is provided a substantially annular motor support member 144 shown in FIG. 12. This support member has a circular recess 146 formed on its top side and into this recess a reduced bottom end section of the top pivot pin 132 extends. Mounted in this recess is a spherical angular contact bearing 148 which, in one embodiment, has a bore measuring 1¾" and has an outside diameter of 2¹³⁄₁₆ inch. Protecting this bearing and extending around the top edge of the bearing is a suitable seal such as a Chesterton Super Wiper seal 150. Similarly, extending around a reduced upper portion of the bottom pivot pin is a spherical angular contact bearing 152 which is sealed by means of a Chesterton super wiper seal 154. The bottom pivot pin can be greased through grease zerk 156.

Returning to FIG. 12, it will be seen that the motor support member 144 has a bottom extension 160 which is welded to the annular portion of the support member 144 and which has a circular hole 162. The bottom pivot pin projects through the hole 162 from the bottom and is detachably connected to the extension 160 by six screws 164 which extend through a flange extending around the bottom of this pivot pin. Formed between the extension 160 and the annular portion of support member 144 is a cavity 166 which receives the rounded end portion of the horizontal plate 126. In this way, the support member 144 is pivotably supported from below.

Figure 10:
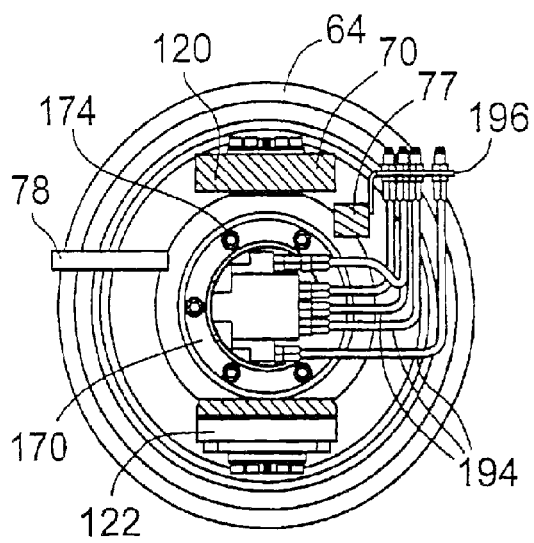
FIG. 10 is a detail sectional elevation taken along the line X-X of FIG. 9.

It can also be seen from FIG. 12 that the support member 144 has a radially inwardly extending connecting flange 170, this flange being formed with a series of fastener holes 172. As shown in FIG. 10, six screws 174 can be used to attach the hydraulic motor 68 to the flange 170 along with its associated planetary gear box 176. The planetary gear box has an annular rotating flange 178 which is attached by nine hex nuts 180 to a circular plate 182 forming a central portion of the hub of the wheel. The nuts are threaded onto studs 184 visible in FIG. 7, these studs extending through the rotating flange on the gear box. It is understood that the left and right wheels 64, 66 are solid rubber wheels and, in one embodiment, each wheel measures 10"×24" in diameter. The left and right wheels 64, 66 are connected by a steering tie rod 190 shown in FIG. 4 which ensures that the wheels pivot in the same way at the same time. It is connected at each end to the tie rod arm 78 of the respective wheel by means of a bolt with a nylon insert lock nut 192.

It will be understood that the hydraulic motor for each wheel unit is provided with pressurized hydraulic fluid through hydraulic lines and fittings of standard construction which are readily available and well known in the art. Most of these lines are not shown for ease of illustration. Some of these lines are indicated at 194 in FIG. 10. Connecting fittings for these lines can be supported by a small bracket 196 shown in FIG. 12. It will be understood that the hydraulic motor itself and its gear box are of standard construction and accordingly a detailed description herein is deemed unnecessary.

Various other features in the illustrated exemplary low profile conveyor vehicle that are shown in FIGS. 1 to 3 include a plastic energy chain 200 through which electrical cables and wires are fed for the operation of the vehicle and an energy chain guide 202 which helps to support the movement of the energy chain. Mounted to the frame on the left side is an electrical power box 204 of standard construction, this box having an access door 206. Mounted to the same side of the frame is an electric motor 208 which powers first and second hydraulic pumps 210 and 212, the first pump 210 being used to drive the hydraulic motors for the wheels and the second motor 212 being used to power other hydraulic components on the vehicle. Two standard filters for the hydraulic system are provided at 214 on the right side of the vehicle. Mounted above these filters is a junction box 116. A third hydraulic filter can be provided at 218 adjacent the pump 212. On or between the two longitudinal main frames of the frame 16 and adjacent one of the cross-frames 220 is a hydraulic fluid reservoir 222. Another junction box for electrical components including connectors is provided on the right side at 224. The side mounted electrical motor 38 for the head pulley is connected to a conveyor gear box 226 which has an output shaft connected to the shaft of the head pulley. In one embodiment, the motor 38 is a 7.5 kwatt or 10 hp motor. Also on the right side of the vehicle there is mounted to the longitudinal frame member a hydraulic assembly manifold 230 which is protected by a shroud or guard 232. On the same side of the frame near the motor 38 is a control box containing a programmable logic controller for controlling the operation and steering of the vehicle, the box indicated at 234. In a known manner, the vehicle 10 can also be provided with water sprayers, two of which are indicated at 240, 242. Water hoses (not shown) are connected to the sprayers to reduce dust levels generated by the conveyor system.

Figure 15:
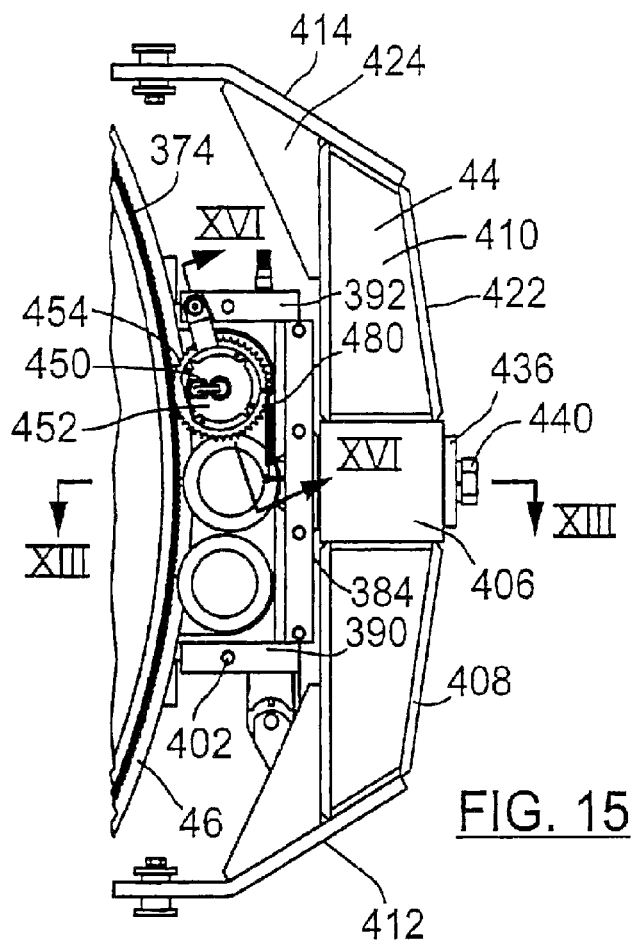
FIG. 15 is a bottom view showing a portion of the curved track and the hitch unit mounted for rolling movement on the track.
Figure 16:
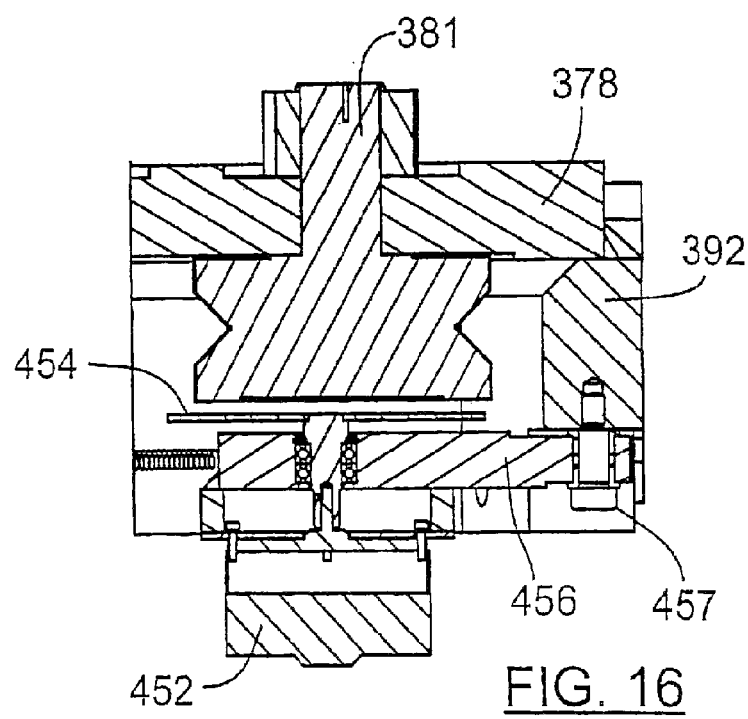
FIG. 16 is a vertical cross-sectional detail taken along the line XVI-XVI of FIG. 15.

FIGS. 13 and 15 illustrate the pivot mechanism or pivoting hitch mechanism 44 for pivotably connecting the mobile conveyor machine of FIGS. 1 and 2 at its inby end (also sometimes referred to herein as its first end) to an adjacent end section of another mobile conveyor machine which can be constructed in the same manner as the machine or vehicle of FIGS. 1 and 2. As indicated above, this pivot mechanism includes the curved track 46 which can be of uniform transverse cross-section and, in an exemplary version, has the cross-section illustrated in FIG. 14. The curved track is bent in a horizontal circular arc as clearly shown in FIG. 5, for example, and this arc has a center of curvature located midway between the propelling devices, that is the wheels 64, 66. This center of curvature is indicated at C in FIG. 3. The center of curvature is on a common axis of rotation for the two wheels when these two wheels are positioned to move the conveyor mechanism in a straightforwards direction. This axis of rotation is indicated at A in FIG. 3. The track is rigidly mounted on the supporting frame 16 which includes a curved bumper frame 350 having a rectangular transverse cross-section, this frame extending the length of the track. The track, which is preferably made of machined solid steel, can be welded to the bumper frame. Each end of the track can be fitted with a rectangular stop plate 352 secured in place by screws threaded into holes formed in each end of the track. An exemplary form of the track has a cross-section such as that shown in FIG. 14. The track has two opposite roller engaging sides 354, 356, with the side 354 being on the inner side of the track and forming a concave curve and the side 356 being on the outer side and forming a convex curve. Each of these sides in the exemplary illustrated version engages three rollers with one of the rollers engaging the side 356 being shown in cross-section at 358 in FIG. 13. Another roller 360 is shown in part in FIG. 13 and this is one of the three rollers engaging the side 354. The three rollers engaging the side 356 form a first set of rollers and the three rollers engaging the side 354 form a second set of rollers. It will be seen that the track 46 is captured and held between the first and second set of rollers. The rollers of both sets have V-grooves 362 formed about their circumferences. The use of three rollers in each set helps keep the hitch unit correctly oriented on the track at all times.

Turning now to the exemplary cross-section illustrated in FIG. 14, the outer convex side 356 which faces towards an adjacent end of the mobile conveyor machine has an upper sloping surface 364 which extends at a 45° angle to the vertical centerline Z of the track. The outer surface also has a lower sloping surface 366 which extends at a 45° angle to the axis Z and there can be a short vertical surface provided at 368. The inner roller engaging side 354 is similarly shaped with 45° sloping surfaces at 370 and 371. These surfaces can be formed by a standard machining process. Also formed in the track member is a rectangular groove 372 which can extend the length of the track member on the side 356. The purpose of this groove is to accommodate a length of roller chain 374 used in conjunction with an angle sensor described hereinafter.

Figure 17:
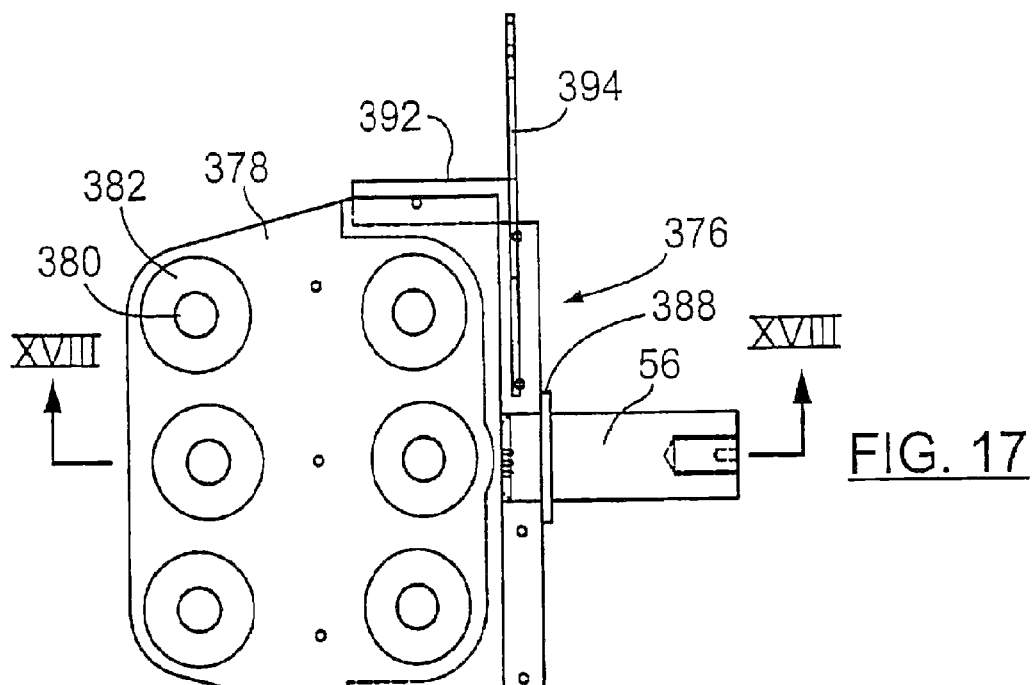
FIG. 17 is a top view of a roller mounting support body which is part of the hitch unit.
Figure 18:
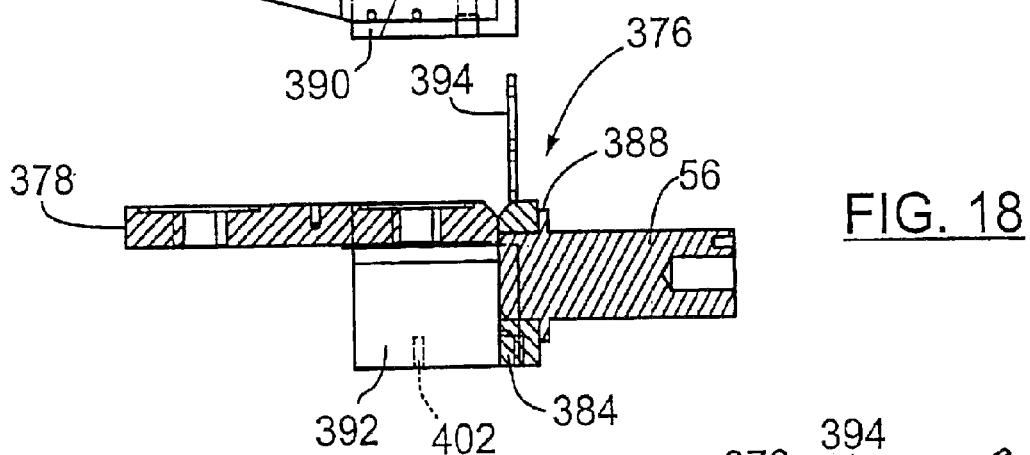
FIG. 18 is a vertical cross-section of the roller mounting support body taken along the line XVIII-XVIII of FIG. 17.
Figure 19:
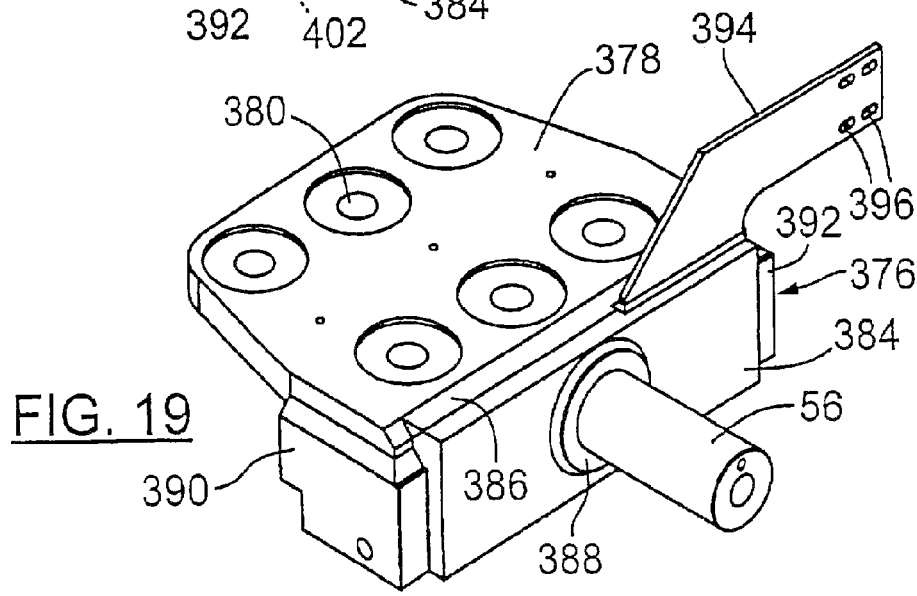
FIG. 19 is a perspective view of the roller mounting support body of FIG. 17 taken from above and from its pivot pin end.

Turning now to the construction of a roller mounting support body 376 illustrated in FIGS. 17 to 19, this body is used to rotatably support the aforementioned two sets of rollers which engage the track 46. This body includes a horizontally extending support plate 378 which can have a generally trapezoidal shape and is formed with six circular holes 380 which accommodate upwardly extending shafts 381 of the rollers. If desired, a shallow circular recess 382 can be formed around each hole to partially accommodate a nut 382 which is shown in FIG. 13 and threaded onto the roller shaft by suitable threads (not illustrated). Each roller unit is a standard roller and therefore has not been shown in detail. The support body also has a vertical pivot pin support plate 384 which is fixedly connected to an edge of the roller support plate 378. The two plates can be welded together at 386. The horizontally extending, central pivot pin 56 is mounted in a circular hole formed centrally in the support plate 384. The pin 56 is formed with a circumferential flange 388 near its inner end, this flange resting against the support plate 384. The inner end of the pivot pin can be welded to the plate 384. To strengthen the support body 376 two rectangular side plates can be welded thereto at 390, 392. A support plate 394 can be welded to the top edge of the plate 384 and is shaped to form an obtuse angle. Four fastener holes 396 can be formed in the outer end of this support plate. The arm 394 is used to detachably connect one end of the aforementioned energy chain 200. If desired, a cover plate 395 (see FIG. 26) can be attached to the bottom of the support body 376 by means of screws 400 inserted through the cover plate and threaded into holes 402. It will be understood that each roller is provided with internal bearings (not shown) of standard construction which allow the roller to rotate freely about its shaft.

Figure 20:
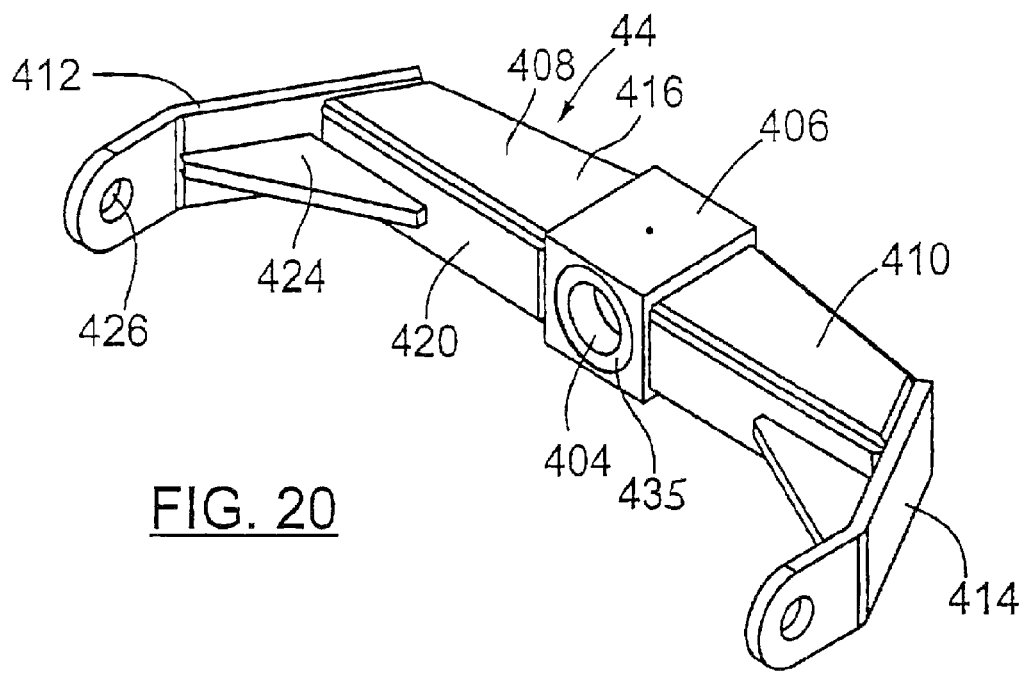
FIG. 20 is perspective view of a pivoting hitch frame which is pivotably connected to the support body of FIG. 17, this hitch frame being shown from above and from an inner side thereof.
Figure 21:
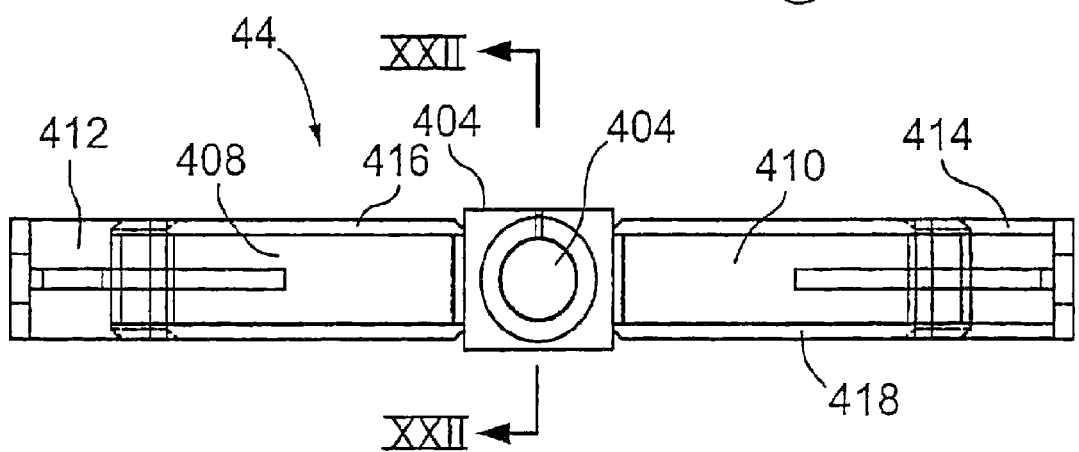
FIG. 21 is an inner side view of the hitch frame of FIG. 20.
Figure 22:
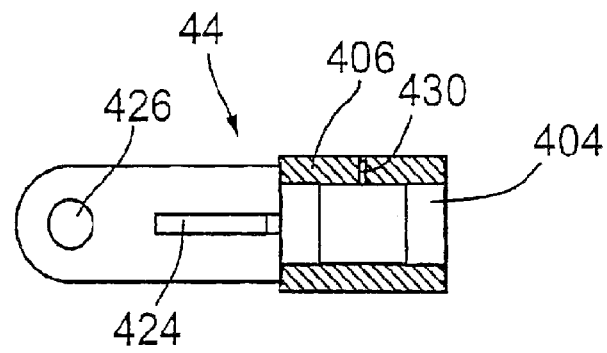
FIG. 22 is a vertical cross-section of the hitch frame taken along the line XXII-XXII of FIG. 21.
Figure 23:
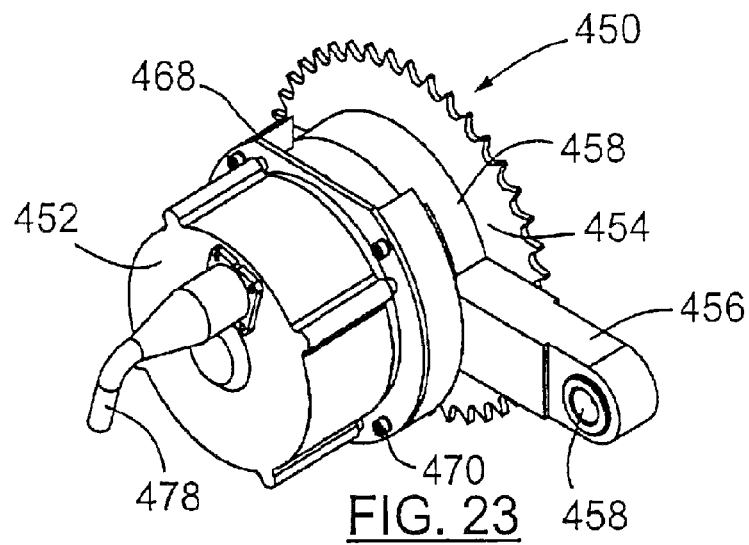
FIG. 23 is a perspective view of an intercar angle sensor assembly mountable on the hitching apparatus.

Turning now to the construction of the pivoting hitch mechanism or hitch frame 44 illustrated separately in FIGS. 20 to 22, this frame is pivotably connected to the support body 376 by means of the pivot pin 56. The pivot pin extends into a pin passageway which is formed in a transverse center of the frame. It will be understood that the passageway 404 which has a circular cross-section extends in a radial direction relative to the radius of the track 46. The hitch frame includes a central block 406 in which the passageway is formed, two tubular arm sections 408, 410 and two end sections 412, 414 located on opposite sides of the pivot pin and spaced therefrom, these end sections being adapted for a pivot connection to an adjacent end section of a second or another mobile machine (similar to or the same as the illustrated machine of FIGS. 1 and 2) during use of the hitch apparatus. Each arm section 408, 410 can be formed from a horizontal top plate 416, a similar, horizontal bottom plate 418, an inner rectangular plate 420 and a rectangular, vertical outer plate 422 (see FIG. 5). These plates can be made of ¾ inch steel plate and can be rigidly connected by welding. Each end section 412, 414 can be formed from a bent steel plate forming an obtuse angle as shown in FIG. 20. The plate used can be one inch steel plate and its connection to its arm section can be strengthened by a triangular brace or gusset 424. A circular hole 426 is formed in the rounded end of each end section to receive a respective one of the car hitch pins 56 shown in FIGS. 1, 2 and 5. Thus, the hitch apparatus of this invention can be pivotably connected to an adjacent second mobile machine by means of these hitch pins which permit relative pivotable movement about a horizontal axis between the two mobile machines or mobile conveyors.

As shown in FIGS. 13 and 22, a grease passageway 430 can be formed in the top of the block 406 and a grease fitting or grease zerk is mounted in the block at the outer end of this passageway. Extending around the pivot pin are fiberglass bushings 432 with one located adjacent the flange 388 and the other located adjacent the outer end of pin passageway 404. Also, a fiberglass thrust bearing 434 can be sandwiched between the inner end of the block 406 in a shallow, circular recess 435 and the flange 388. Hitch mechanism 44 is retained on the central pivot pin 56 by means of a donut-shaped retainer plate 436 which can be $7/8^{th}$ inch plate having a central hole measuring $1\,13/16^{th}$ inch. Both the plate 436 and the pivot pin are formed with aligned holes to receive a dowel pin 438 which acts to prevent rotation of the plate relative to the pin. The plate 436 is held in place by 3½ inch long screw 440 which extends into a threaded hole formed in the center of the pivot pin. It will thus be seen that the hitch mechanism 44 is free to pivot about the horizontal pivot axis formed by the pivot pin thereby allowing relative movement about this pivot axis between the adjacent connected mobile conveyor vehicles.

For use with an automatic steering system for a train of these mobile conveyor machines of the type described above, it can be desirable for the steering system to know the intercar angle between adjacent cars in the train. Due to the fact that the present mobile conveyor machine has no pivot joint located at the pivot axis between adjacent cars (in other words, there is only a virtual pivot point midway between the two wheels of the machine described herein), a special intercar angle sensor can be provided in conjunction with the pivot mechanism of the present invention so that an electrical signal indicative of the intercar angle can be provided to the steering control for the conveyor train. An exemplary form of such a sensor is illustrated in FIGS. 15, 16 and 23 to 25. This sensor indicated generally by reference 450 is able to determine the angle between the central longitudinal axis of the illustrated mobile conveyor machine 10 and a central longitudinal axis of another mobile conveyor machine which can be constructed in the same or a similar manner as the illustrated machine. Although not shown in FIG. 23, the sensor includes the aforementioned tensioned roller chain 374 mounted on the track 46. It will be appreciated that this chain forms a series of sprocket engaging recesses formed along one side of the track for at least most of the length of the track. These recesses are formed by recess forming members (ie. the pins of the chain). The recesses could also be formed by machining them into the track member itself. The other major component of the sensor is a rotational position transducer 452 which is mounted on the hitch mechanism 44 and, in particular, on the roller support body 376. The sensor has a sensing sprocket 454 which drives an instrument to measure the intercar angle. The transducer 452 can, in one embodiment, send a signal to a Siemens programmable logic controller (PLC) used to steer the train of vehicles. This transducer, which can be of standard construction, can have a signal output ranging between 4-20 milliamps with the output depending upon the sensed intercar angle.

Figure 24:
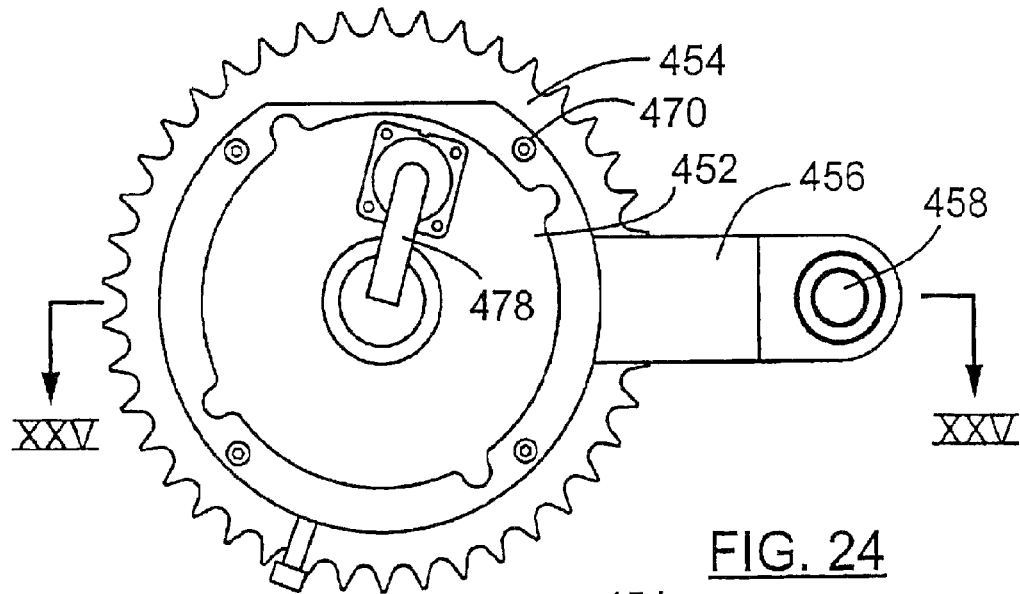
FIG. 24 is a bottom view of the sensor assembly of FIG. 23.
Figure 25:
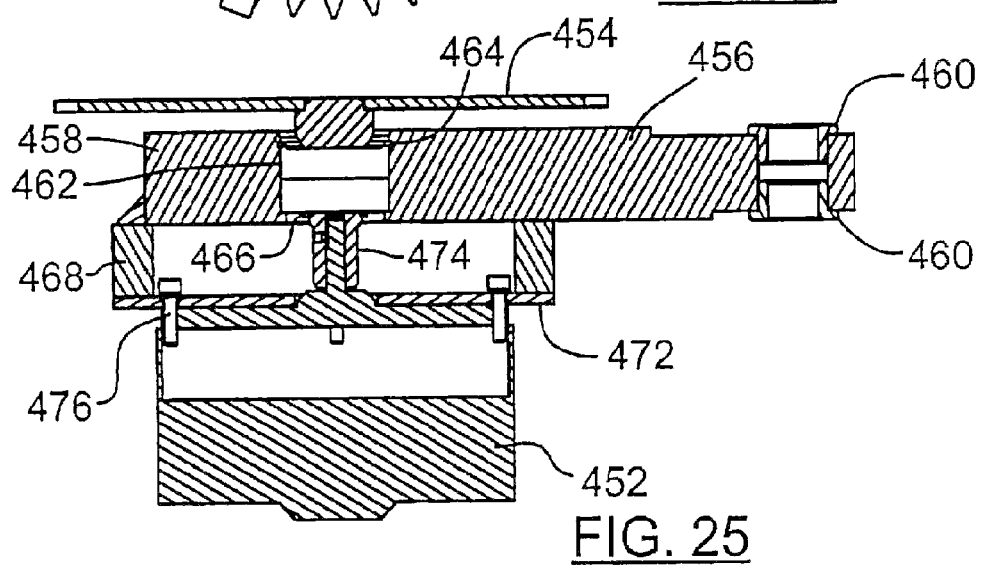
FIG. 25 is an axial cross-section of the sensor assembly taken along the line XXV-XXV of FIG. 24.

With reference to FIGS. 24 and 25, in addition to the transducer, there is shown a mounting arm 456 which includes an annular end section 458 on which the transducer can be mounted. The arm 456 is attached by a pivot pin 457 to the bottom edge of the side plate 392, this pivot pin extending through hole 458. There can be mounted in this hole two Oilite friction bearings 460, one at each end. Rotatably mounting the shaft for the sprocket 454 are two deep groove ball bearings 462 arranged next to one another. The bearings can be held in an opening by means of a retaining ring 464. On the transducer side of the bearings there can be a further external retaining ring 466. Welded to the arm on the side opposite the sprocket is a transducer mount 468 which extends through an arc of more than 270°. Attached to this mount by four screws 470 is a transducer mounting plate 472. The central shaft of the transducer extends through this plate and is received within a central passageway formed in sprocket shaft 474 and is secured thereto (for example by a set screw) for rotation therewith. The transducer is detachably mounted to the plate 472 by four screws 476. The end of an electrical control cable operatively connected to the transducer is indicated at 478.

It will be seen from the above description that the transducer and its mounting are pivotably mounted to the plate 392 of the hitch mechanism. An elongate coil spring 480 (see FIG. 15) is then provided to bias the sensor and in particular its sprocket 454 into engagement with the roller chain 374. The reason for this spring mounting is to provide some flexibility to the sensor mount, thereby reducing the possibility of damage, for example, if something such as dirt or a stone should become lodged in the sprocket or the roller chain. It should also be noted that the roller chain is kept under tension itself by means of an adjustable tension rod 482 at one or both ends of the chain.

Figure 27:
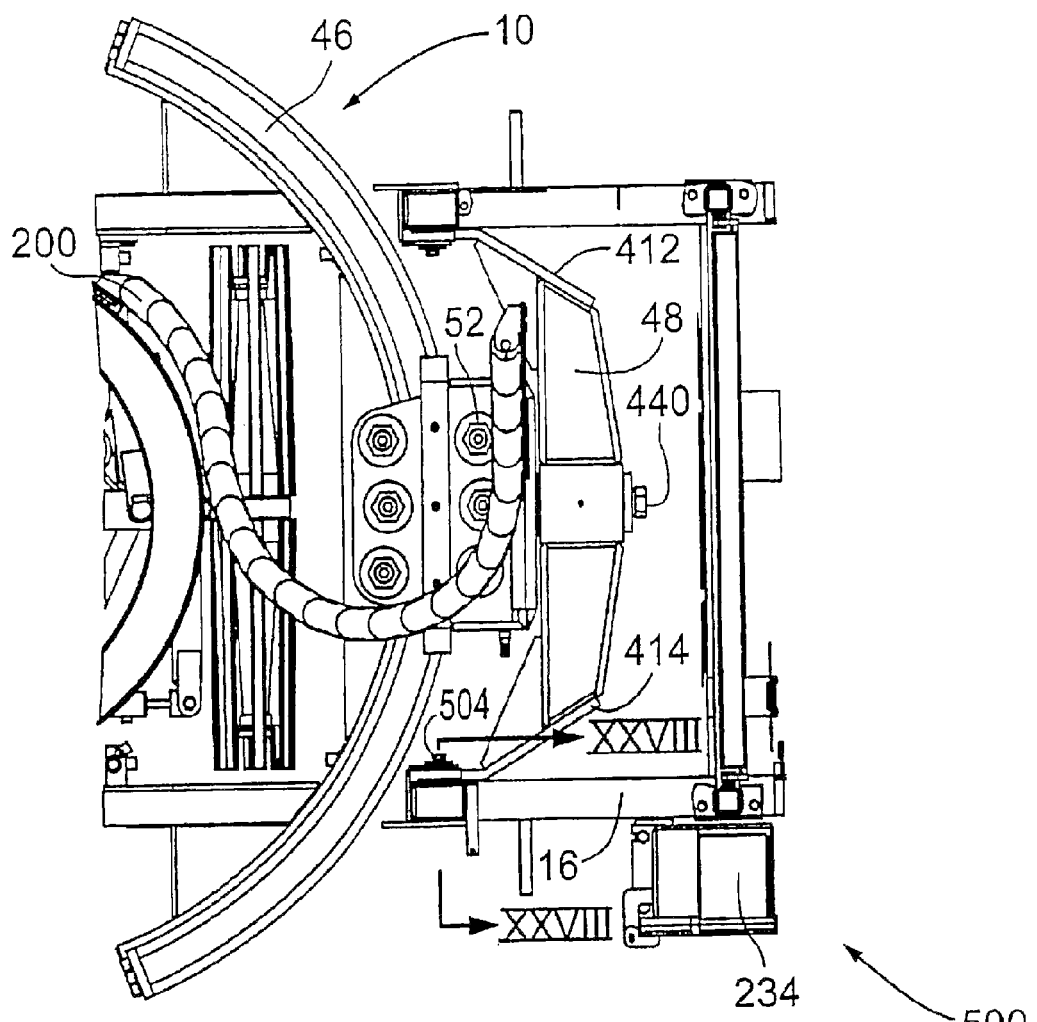
FIG. 27 is a detail plan view of the hitching apparatus mounted on one end of a mobile conveyor machine and showing an adjacent end section of an adjacent conveyor machine connected thereto.
Figure 28:
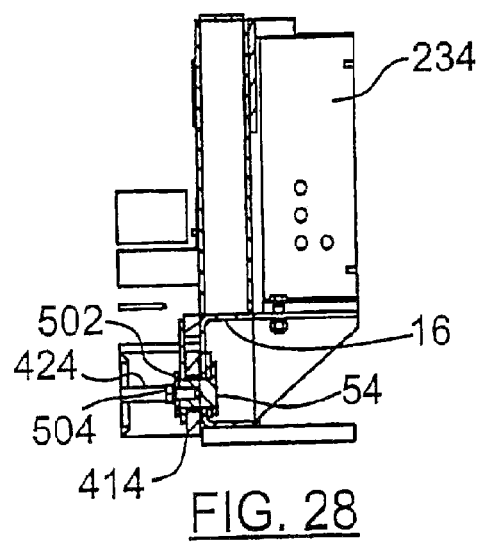
FIG. 28 is a vertical cross-section taken along the line XXVIII-XXVIII of FIG. 27 showing one of the two pivot pin connections joining the two conveyor machines.

FIGS. 27 and 28 illustrate an actual connection between the inby end of one mobile conveyor machine constructed according to the invention with the outby end of another mobile machine 500, only an end section of which is shown. Two car hitch pins 54 are used to attach the rolling hitch device 48 to the two ends of the frame 16. Each hitch pin can be held in place by a washer plate 502 and a screw 504 that extends through the plate 502 and into a threaded hole in the end of the hitch pin.

Figure 26:
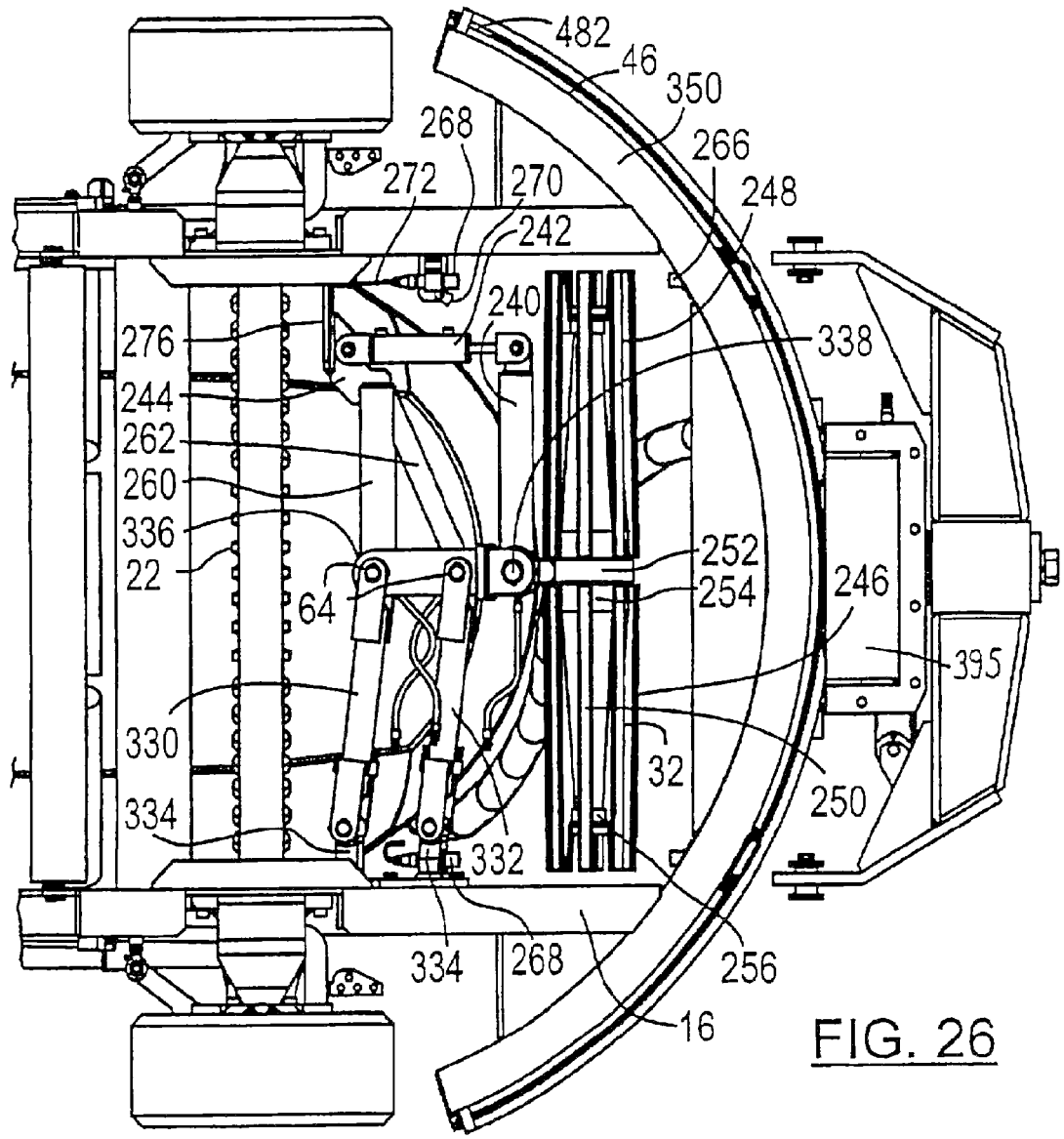
FIG. 26 is a partial bottom view of the conveyor machine showing the end where the tail pulley is mounted and the hitching apparatus.

Turning now to the mounting mechanism for the tail pulley 32, this mounting system as seen most clearly in FIG. 26 includes two parallel links or swing arms 330 and 332 which are pivotably mounted on pivot pin sleeves 334 fixedly mounted on the inside of the frame 16. The inner ends of the links are located along the longitudinal centreline of the car and are pivotably connected to central mounting frame 336 which provides support for a substantially vertically extending pivot pin 338. Pivotably connected to this pin is a belt control arm 240 which in turn is pivotably connected to the actuator rod of a belt training hydraulic cylinder 242. The closed end of this cylinder is pivotably connected to an adjustable horizontal support plate 244.

The tail pulley itself comprises two rotatable pulley sections 246 and 248 which rotate about a non-rotating central support shaft (not shown) located along the centerline of the pulley indicated at 250. The shaft extends from opposite sides of a central, circular support block 252 rigidly connected to one end of the control arm 240. Mounted on opposite sides of the support block are two central bearings located at 254, each rotatably supporting a respective one of the pulley sections 246, 248. In a known manner, the exterior of these pulley sections comprises a series of parallel, spaced-apart metal slats, the inner ends of which are mounted on an outer annular support member which contains the central bearing. An outer bearing located at 256 is mounted on the outer end of each section of the shaft 50 to support the outer end of the respective pulley section. Horizontally extending frame members 260, 262 are fixedly connected to the central frame 336 and are also connected to the plate 244. These frame members are used to apply force to the tail pulley in order to tension same.

The position of the tail pulley can be adjusted for belt training purposes using the hydraulic cylinder 242. In order to provide an automatic system for correcting the position of the conveyor belt, a photosensor system can be provided at each end of the tail pulley. As illustrated, there are two photoemitters 266 mounted on the curved track 46. For each of these photoemitters there is a photoreceiver 268 which can be seen in FIG. 26. As long as the conveyor belt is properly centered on the tail pulley, pulses of a light beam can travel from each photoemitter 266 (through the gaps in the adjacent pulley section) to its respective photoreceiver which is mounted on the inside of one of the longitudinal frame members forming the frame 16. However, if the belt moves transversely on the tail pulley so as to block entirely one of the light beams, this provides a signal to a programmable logic controller which causes retraction or extension of the actuator rod of the hydraulic cylinder 242. The actuator rod will move in a direction so as to cause the central shaft of the tail pulley to be pivoted in a horizontal plane so as to tighten the belt on the side to which the belt has moved. This will tend to cause the belt to move back towards its center position.

As illustrated, each photosensor is aligned with the end section of the tail pulley so that the light beam is regularly broken by the parallel slats on the exterior of the tail pulley. Because of this arrangement, each photoreceiver sends a pulse signal to the programmable logic controller when the belt is not entirely blocking the light beam. Thus, if the belt is properly centered, pulse signals are being sent to the controller by both photoreceivers 268. When a pulse signal is not being emitted by one of the light receivers, then this indicates that the belt has moved too much in the direction of this particular receiver and the control system will take steps to re-center the belt.

Extending from a small winch 270 is a two inch wide nylon strap 272. The winch and strap are positioned above one photoreceiver 268 and are mounted on the inside of the main frame 16 of the vehicle. The strap extends to a metal hook which extends through a hole formed in the end of a vertical connecting plate 276. The plate 276 is rigidly connected to one edge of the horizontal plate 244. It will be appreciated that once the conveyor belt is mounted in place and extends around the tail pulley (as well as the head pulley) the conveyor belt can be tensioned properly by pulling on the strap 272 which in turn will cause the frame members 260, 262 and the attached central frame 336 to move in a direction towards the tail pulley end of the vehicle.

While the present invention has been illustrated and described as embodied in an exemplary embodiment, ie. an embodiment having particularly utility for use as a low profile, mobile conveyor vehicle suitable for use with other similar conveyor vehicles, it is to be understood that the present invention is not limited to the details shown herein, since it will be understood that various omissions, modifications, substitutions and changes in the forms and details of the disclosed conveyor vehicle and its method of operation may be made by those skilled in the art without departing in any way from the spirit and scope of the present invention. For example, those of ordinary skill in the conveyor art will readily adapt the present disclosure for various other conveyor applications without departing from the spirit and scope of the present invention.

What is claimed is:

1. A mobile conveyor machine for a cascading conveyor system in the form of a series of mobile conveyor machines pivotally connected together in the form of a conveyor train, said conveyor machine comprising:
    an elongate main supporting frame arranged substantially horizontally and having longitudinal side frame members and first and second ends, said supporting frame straddling a central longitudinal axis of the conveyor machine;
    a conveyor belt system mounted on said supporting frame and arranged to convey materials from said first end towards said second end;
    a pair of transversely aligned propelling devices each separately connected to a respective one of the longitudinal side frame members for pivotal movement about a respective one of two generally vertical pivot axes for the propelling devices, said pair being located near but spaced from said first end and having a common axis of rotation when said propelling devices are positioned to move the conveyor machine in a straight forwards direction,
    power steering means for steering said pair of propelling devices; and
    a pivot mechanism for pivotally connecting said mobile conveyor machine at said first end to an adjacent end section of another mobile conveyor machine, said pivot mechanism including a curved track bent in a horizontal circular arc having a centre of curvature located midway between the propelling devices on said axis of rotation and rigidly mounted on said supporting frame and a hitch unit mounted for rolling movement on said track and connected to said track, said hitch unit having roller means for engaging said track and said hitch unit being adapted for detachable connection to said another mobile conveyor machine.

2. A mobile conveyor machine according to claim 1 wherein said track has two opposite roller engaging sides and said roller means comprises a first set of rollers engaging one of said roller engaging sides and a second set of rollers engaging the other roller engaging side, whereby said track is captured between the first and second sets of rollers.

3. A mobile conveyor machine according to claim 1 wherein said hitch unit comprises a pivot pin having a central pivot axis, a roller mounting frame on which said roller means are rotatably mounted and to which said pivot pin is connected, and a connecting frame mounted on said pivot pin for pivotal movement about said pivot axis which extends radially relative to said curved track, said connecting frame extending outwardly from opposite sides of said pivot pin and having two opposite end sections adapted for connection to said adjacent end section of said another mobile conveyor machine, whereby said hitch unit enables the conveyor machine to pivot about said central longitudinal axis relative to said another mobile conveyor machine.

4. A mobile conveyor machine according to claim 3 wherein each end section of said connecting frame has a pivot pin connector with a central pivot axis substantially axially aligned with the pivot axis of the other pivot pin connector and the two pivot pin connectors enable said mobile conveyor machine to pivot about a substantially horizontal axis relative to said another mobile conveyor machine.

5. A mobile conveyor machine according to claim 1 wherein said pivot mechanism comprises sensor means for determining an angle between the central longitudinal axis of the mobile conveyor machine and a central longitudinal axis of said another mobile conveyor machine and for transmitting an electrical signal indicative of said angle to a steering controller for said conveyor train.

6. A mobile conveyor machine according to claim 1 further comprising a tensioned roller chain extending along said curved track, a rotational position transducer mounted on said hitch unit, and a sensing sprocket rotatably mounted on a shaft of said rotational position transducer and engaging said roller chain, wherein said transducer is capable of determining an angle between said central longitudinal axis of said mobile conveyor machine and a central longitudinal axis of said another mobile conveyor machine.

7. A mobile conveyor machine according to claim 1 further comprising a hydraulic motor means for driving each propelling device, hydraulic pump means for providing hydraulic fluid under pressure to said motor means, and an electrical motor for powering said hydraulic pump means, said electrical motor being mounted on said supporting frame.

* * * * *